United States Patent
Molnar et al.

(10) Patent No.: US 8,605,838 B2
(45) Date of Patent: Dec. 10, 2013

(54) INTERFERER PARAMETER ESTIMATION METHOD AND APPARATUS

(75) Inventors: Karl J. Molnar, Cary, NC (US); George Jöngren, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 370 days.

(21) Appl. No.: 12/883,698

(22) Filed: Sep. 16, 2010

(65) Prior Publication Data
US 2012/0069889 A1    Mar. 22, 2012

(51) Int. Cl.
| H03D 1/04 | (2006.01) |
| H03D 1/06 | (2006.01) |
| H03K 5/01 | (2006.01) |
| H03K 6/04 | (2006.01) |
| H04B 1/10 | (2006.01) |
| H04L 1/00 | (2006.01) |
| H04L 25/08 | (2006.01) |

(52) U.S. Cl.
USPC ........... 375/346; 375/260; 375/347; 375/349; 375/267; 375/285; 455/500; 455/501; 455/63.1; 455/296

(58) Field of Classification Search
USPC ......... 375/346, 347, 349, 350, 231, 267, 285, 375/260; 455/500, 501, 63.1, 296
See application file for complete search history.

(56) References Cited

U.S. PATENT DOCUMENTS

2010/0067366 A1*  3/2010  Nicoli ........................ 370/210
2010/0220651 A1   9/2010  Chen et al.

FOREIGN PATENT DOCUMENTS

| EP | 2031790 A1 | 3/2009 |
| WO | 2009059816 A1 | 5/2009 |
| WO | 2011007334 A2 | 1/2011 |
| WO | WO 2011/007334 A2 | 1/2011 |

* cited by examiner

*Primary Examiner* — Phuong Phu

(57) ABSTRACT

Interference is estimated in an Orthogonal Frequency Division Multiplexing system by receiving at a wireless receiver pilot symbols and data symbols transmitted in time and frequency via resource blocks, detecting a first one of the data symbols transmitted to the wireless receiver via a time-frequency resource element of a first one of the resource blocks and identifying a second one of the resource blocks adjacent the first resource block having related interference parameters. The interference is estimated based on the pilot symbols transmitted via the first resource block and the pilot symbols transmitted via the second resource block.

24 Claims, 3 Drawing Sheets

INTERFERER PARAMETER ESTIMATION METHOD AND APPARATUS

TECHNICAL FIELD

The present invention relates generally to interference estimation in wireless communication devices, and particularly to estimating interference based on pilots from multiple resource blocks.

BACKGROUND

Conventional cellular area systems are deployed with mobile terminals that have the capability to mitigate interference. Mitigating interference has the effect of improving the signal to interference plus noise ratio (SINR) measured at the output of the receiver, resulting in better performance. This capability can be used, for example, in detecting transmitted data information or in computing some measure of channel quality information (CQI) that is used for link adaptation and user scheduling.

Canceling interference typically requires the estimation of interferer parameters. The process of interference parameter estimation is more easily accomplished when the interferer does not vary significantly in time and/or frequency due to fading, dispersion or intermittent transmission of the interferer. Since the estimation process typically is performed in the presence of random (i.e. thermal) noise, a sufficient number of estimation samples are required to minimize the effects of the noise. Further, estimation degrades when those samples are used where the interference varies abruptly.

In OFDM (Orthogonal Frequency Division Multiplexing) systems, such as LTE (Long Term Evolution), data symbols are transmitted according to a time-frequency grid, where a grid element is referred to as a resource element (RE). Resource elements are grouped together into larger groups called resource blocks (RBs). Certain resource elements are allocated within a resource block for performing channel estimation. These are commonly referred to as reference REs or pilots. During the detection process, channel estimates are obtained at the location of each data RE. However, since knowledge of interferer pilots is unknown, interferer parameters, in the form of the interferer covariance, are estimated once per resource block and used for interference-rejection combining (IRC).

During detection of the nth data resource element, the maximum-likelihood (ML) combining weight vector, $w_{mL,n}$, using the IRC approach can be formulated as given by:

$$w_{ML,n} = R_e^{-1} G_n P_n, \quad (1)$$

where $G_n$ is the channel estimate at the nth data RE, $P_n$ is the precoding in effect for that data RE, and $R_e$ is the estimated impairment covariance parameter matrix. The impairment covariance, $R_e$, is estimated as given by:

$$R_e = \frac{1}{K} \sum_{k=1}^{K} e_k, \quad (2)$$

where $e_k$ is the residual error between the received data for the kth pilot in a resource block and the estimated received data for that pilot position. In this case there are assumed to be K pilots within a resource block. The computed weights are applied to the received data $y_n$ for this data RE to form the detection statistic $d_n$ as follows:

$$d_n = w_{ML,n}{}^H Y_n. \quad (3)$$

Alternate forms of computing the detection statistic are to compute the MMSE combining weight estimate using the data covariance.

It is preferred to use as many pilots as possible (i.e. as large a K in equation (2) above as possible) to compute the interferer covariance, provided that those pilot positions share the same interference environment. In practice, this is not feasible for several reasons. First, the interference is temporally intermittent so incorporating pilots from multiple subframes to perform the estimation is not reliable. Even if interference is present in a previous subframe, it may arise from a different interferer. Additionally, even if the same interferer is present, rapid channel fading may cause the interference environment to change. Second, implementation constraints may limit the number of pilots within a subframe that can be used for impairment covariance estimation. For example, to reduce latency, only pilots from the first of two slots within a subframe may be available to perform this estimation, effectively cutting in half the number of useful pilots. Further, pilots located within the first three OFDM symbols of a subframe (assuming synchronous desired and interferer transmissions) may overlap with the interferer's control channel. Since the transmission formats on the control and data channels may be different, those pilots that overlap the control channel will see a different interference environment (and may not help in reliably estimating the interferer covariance on the data REs). Third, pilots from adjacent resource blocks observe a different interference environment because dispersion varies with the propagation channel across frequency. Fourth, the precoding applied to interferer transmission can vary across resource blocks, again changing the interference environment.

SUMMARY

According to an embodiment of a method for estimating interference in an Orthogonal Frequency Division Multiplexing system, the method includes receiving at a wireless receiver pilot symbols and data symbols transmitted in time and frequency via resource blocks, detecting a first one of the data symbols transmitted to the wireless receiver via a time-frequency resource element of a first one of the resource blocks, and identifying a second one of the resource blocks adjacent the first resource block having related interference parameters. Interference is estimated based on the pilot symbols transmitted via the first resource block and the pilot symbols transmitted via the second resource block.

According to an embodiment of a wireless mobile device operable to receive Orthogonal Frequency Division Multiplexing signals, the mobile device includes a front end circuit, a symbol detector, a grouping unit and an interference estimator. The front end circuit is operable to process pilot symbols and data symbols received in time and frequency via resource blocks. The symbol detector is operable to detect a first one of the data symbols transmitted via a time-frequency resource element of a first one of the resource blocks. The grouping unit is operable to identify a second one of the resource blocks adjacent the first resource block having related interference parameters. The interference estimator is operable to estimate interference based on the pilot symbols transmitted via the first resource block and the pilot symbols transmitted via the second resource block.

According to an embodiment of a base station operable to receive Orthogonal Frequency Division Multiplexing signals, the base station includes a front end circuit, a symbol detector, a grouping unit and an interference estimator. The front end circuit is operable to process pilot symbols and data symbols received in time and frequency via resource blocks.

The symbol detector is operable to detect a first one of the data symbols transmitted via a time-frequency resource element of a first one of the resource blocks. The grouping unit is operable to identify a second one of the resource blocks adjacent the first resource block having related interference parameters. The interference estimator is operable to estimate interference based on the pilot symbols transmitted via the first resource block and the pilot symbols transmitted via the second resource block.

Of course, the present invention is not limited to the above features and advantages. Those skilled in the art will recognize additional features and advantages upon reading the following detailed description, and upon viewing the accompanying drawings.

DETAILED DESCRIPTION

The embodiments described herein use pilots (i.e. reference resource elements or REs) from multiple resource blocks (RBs) to compute impairment covariance estimates. Resource blocks are organized into groups called resource block groups. Each resource block group includes a plurality of resource blocks, e.g. 2, 3, 4 or more resource blocks per group corresponding to transmission bandwidths of 5, 10, 20 MHz, etc. respectively. When the majority of interfering resource blocks are scheduled using resource allocation type 0 for which the smallest addressable unit is a resource block group, and the precoder granularity is not finer than a single resource block group, then incorporating pilots from resource blocks within the same resource block group can be used for impairment covariance estimation.

Figure 1:
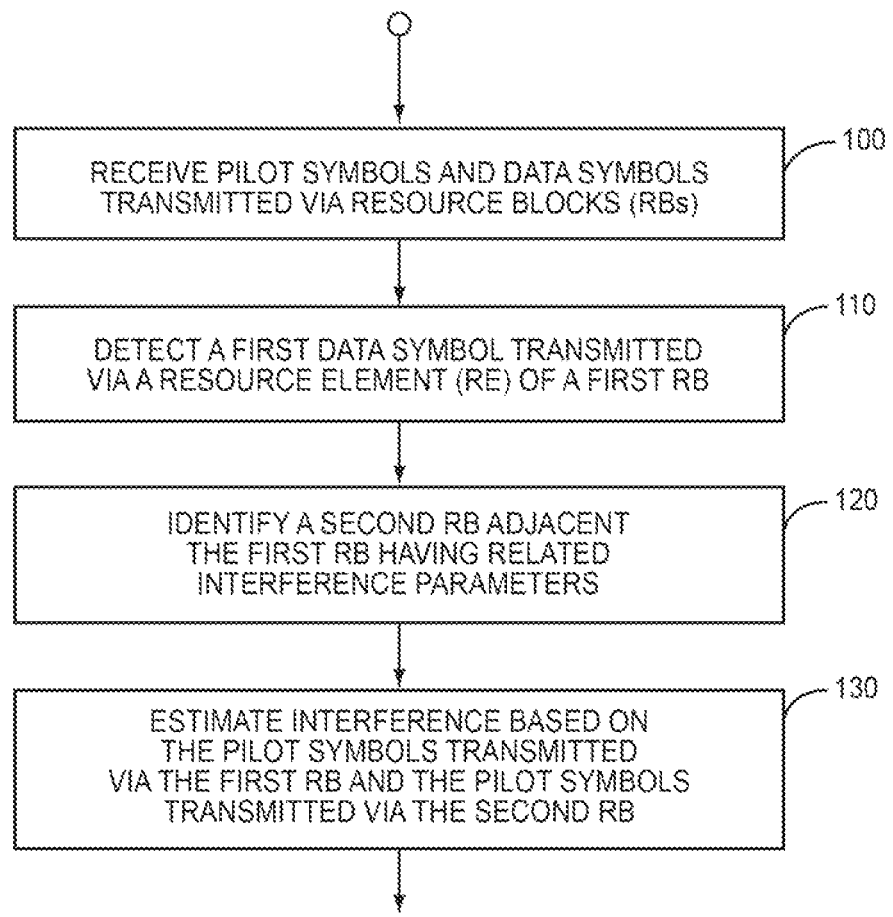
FIG. 1 illustrates an embodiment of a method of estimating interference in an OFDM system.

FIG. 1 illustrates an embodiment of a method of estimating interference in an OFDM system. The method includes receiving at a wireless receiver pilot symbols and data symbols transmitted in time and frequency via resource blocks (Step 100). The method continues with detecting a first one of the data symbols transmitted to the wireless receiver via a time-frequency resource element of a first one of the resource blocks (Step 110) and identifying a second one of the resource blocks adjacent the first resource block having related interference parameters (Step 120). Interference is then estimated based on the pilot symbols transmitted via the first resource block and the pilot symbols transmitted via the second resource block (Step 130) e.g. in accordance with equation (2) but with some of the pilots being from adjacent resource block(s).

In one embodiment, minimal knowledge of the interfering signal (e.g. the interferer transmission bandwidth) is known at the wireless receiver. Accordingly, the wireless receiver performs a blind determination of the resource block group positions. Pilots from one or more adjacent resource blocks in the same blindly detected resource block group are used in determining impairment covariance estimates e.g. in accordance with equation (2) but with some of the pilots being from adjacent resource block(s).

In another embodiment, the wireless receiver can use regions of interference with the same or similar characteristics to identify the resource block groups. For example, the wireless receiver can predetermine which resource blocks have related interference parameters based on transmission bandwidth e.g. 2 resource blocks per group for a transmission bandwidth of 5 MHz, 3 resource blocks per group for a transmission bandwidth of 10 MHz, 4 resource blocks per group for a transmission bandwidth of 20 MHz, etc. Alternatively, the wireless receiver predetermines which resource blocks have related interference parameters based on interferer bandwidth in a similar manner. That is, the bandwidth of the interferer determines the number of resource blocks included in each resource block group. In either case, the approach described in co-pending U.S. patent application Ser. No. 12/504,233 filed on 16 Jul. 2009 and entitled "Interfere Region Identification Using Image Processing" considers the time-frequency grid of OFDM tiles as a two-dimensional image of the interference and attempts to identify regions with similar interference profiles for identifying resource block groups. The techniques disclosed in co-pending U.S. patent application Ser. No. 12/504,233 for identifying regions with similar interference profiles can be used herein to identify resource block groups, the content of which application is incorporated herein by reference in its entirety.

Figure 2:
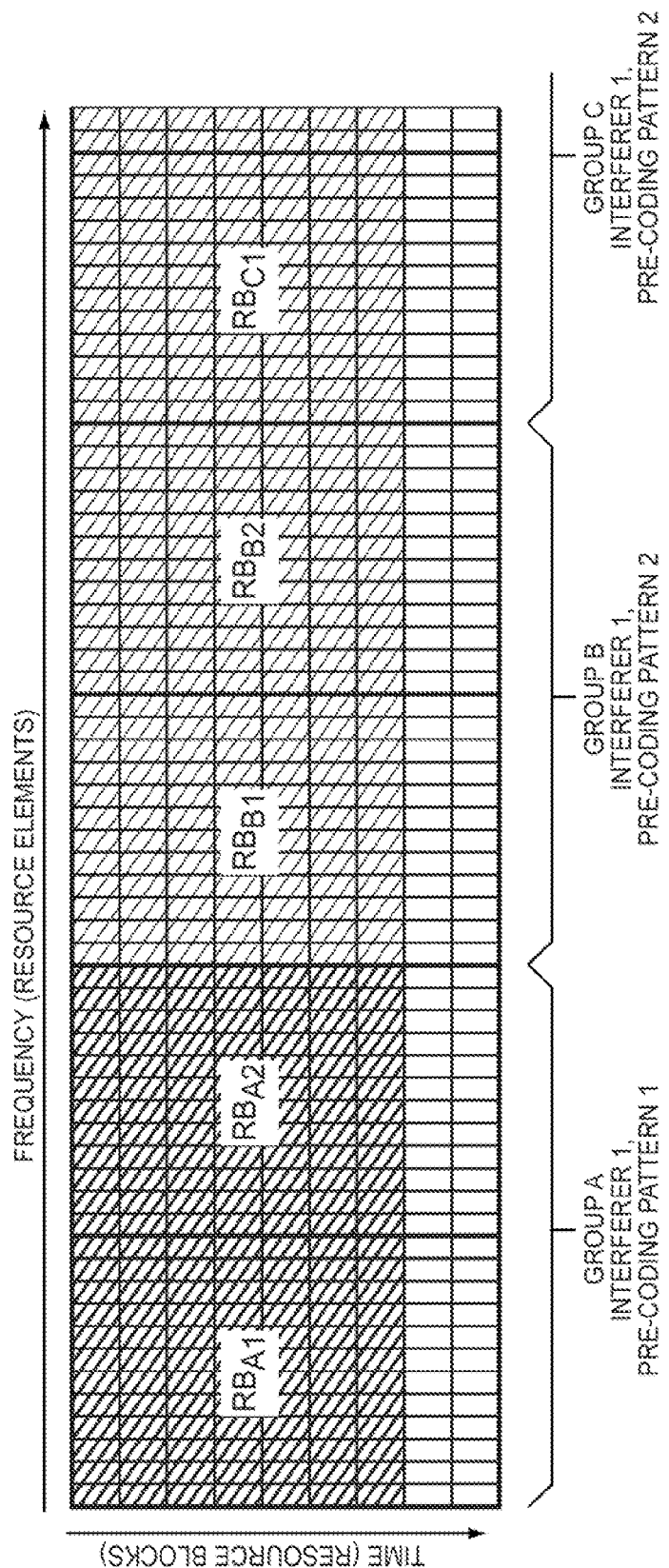
FIG. 2 illustrates an embodiment of OFDM downlink transmission resource blocks organized as groups.

FIG. 2 depicts a representative time-frequency grid of OFDM downlink transmission resource blocks. Each rectangular block shown in FIG. 2 represents a resource element—that is, a predefined number of sub-carriers and transmitted symbol positions. A plurality of resource elements form a resource block, and two or more resource blocks form a resource block group. FIG. 2 shows resource block groups for an exemplary 5 MHz transmission bandwidth, where the resource block group size is two resource blocks. For example, resource block group A includes $RB_{A1}$ and $RB_{A2}$, group B includes $RB_{B1}$ and $RB_{B2}$ and group C includes $RB_{C1}$ and $RB_{C2}$ (out of view in FIG. 2). The resource block groups have the same or similar interferer, but group B and group C have a different precoding pattern than group A. For each target resource block, one or more adjacent resource blocks on either the left and/or right side of the target resource block can be used to improve impairment covariance estimates.

According to the first (i.e. blind) resource block group identification embodiment, the resource block groups are assumed to be predetermined for different transmission bandwidths. Assuming the interferer has the same bandwidth, or with prior knowledge of the interferer bandwidth, a determination of which resource block has useful pilots can be made. According to the second embodiment, an active determination of the interference environment is made to determine which resource blocks can be used to provide additional pilots with the same or similar interference profile. In one embodiment, edges in the interference image are detected. Such an image might be constructed from the error or metric values from a first detection process. As a result, the resource block group sizes may be identified and adjacent resource blocks determined based on the edges detected in the interference image. This way, one or more adjacent resource blocks affected by the same or similar interferer as the target resource block can be used for interference estimation. Additionally, the edge detection approach may provide further information such as the temporal subframe offset for unsynchronized interferers.

Edge detection broadly refers to image processing algorithms that attempt to identify points in an image (or, as here, a two-dimensional array values processed as an image) at which the magnitude of pixels changes sharply, or has discontinuities. Edge detection algorithms may be search-based, in which edges are detected by first computing a measure of edge strength (usually a first-order derivative expression such as the gradient magnitude) and then searching for local directional maxima of the gradient magnitude using a computed estimate of the local orientation of the edge (usually the gradient direction). Other known edge detection algorithms are zero-crossing based, which search for zero crossings in a second-order derivative expression computed from the image in order to find edges (usually the zero-crossings of the Laplacian or of a non-linear differential expression). In either case, a smoothing stage, such as Gaussian smoothing, may be applied as a pre-processing step. A wide variety of edge detection approaches and algorithms are known in the art, and not further explicated herein. Any such algorithms may be advantageously applied to a two-dimensional array of interference measures corresponding to time-frequency positions of received OFDM wireless communication signals, to identify edges of regions of the array having related interference parameters, for performing interference parameter estimation over the identified time-frequency region.

To limit the effects of dispersion on the impairment covariance estimate, it may be desirable to not use pilots too far away from the target resource block, even if those pilots are included in the same resource block group. In one embodiment, a threshold distance in frequency from the target resource block edge can be set so that only pilots with frequency distance less than the threshold value are used to estimate the impairment covariance.

Figure 3:
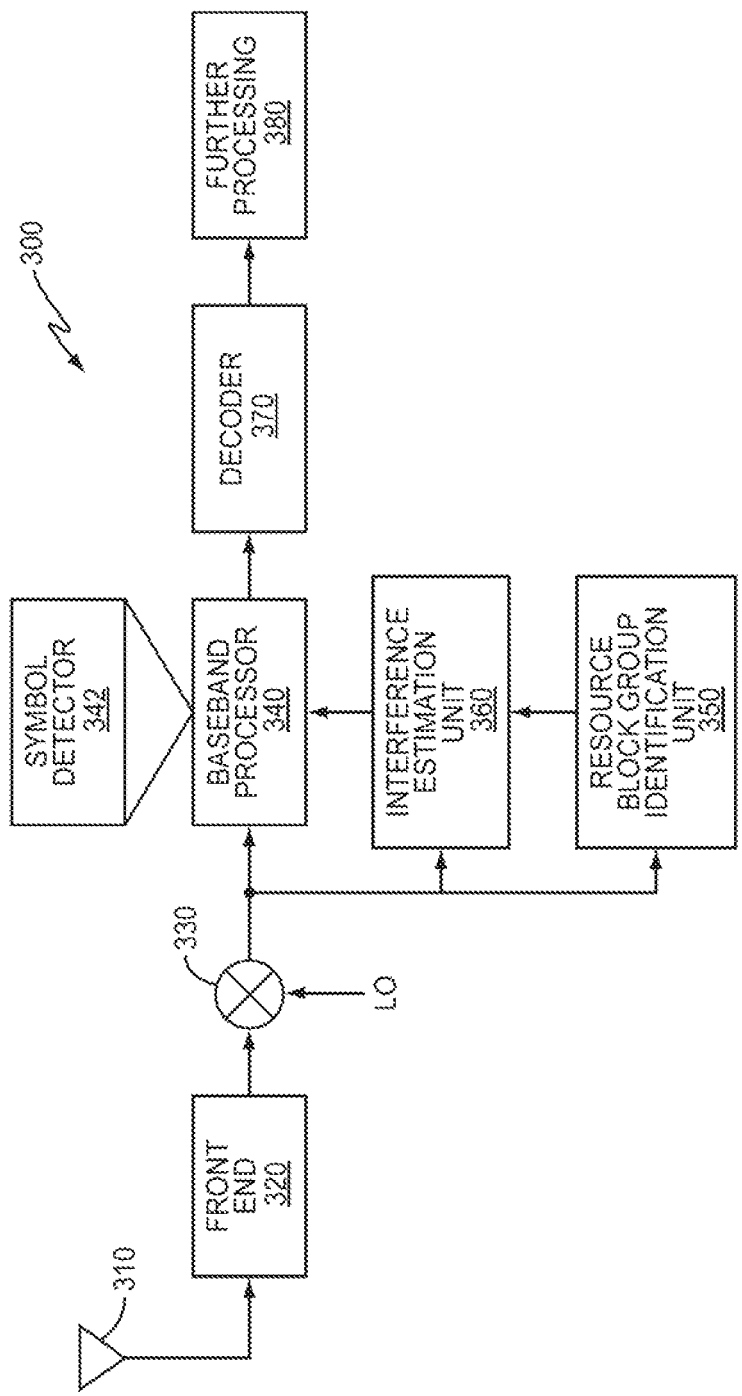
FIG. 3 illustrates an embodiment of a wireless receiver.

FIG. 3 illustrates an embodiment of a wireless receiver 300 for implementing the interference estimation methods described herein. The wireless receiver 300 can be a mobile wireless device or a base station that services mobile wireless devices. The wireless receiver 300 operates in an OFDM wireless communication system, and receives OFDM signals at an antenna 310. The received signals are processed by a front end processing circuit 320 (e.g. including low noise amplification, analog filtering, analog to digital conversion, and the like). The signals are down-converted to baseband at mixer 330 by combining the signals with a signal from a local oscillator (LO). Pilot symbols and data symbols received in time and frequency via resource blocks are processed a baseband processor 340. A symbol detector 342 detects each data symbol transmitted via a time-frequency resource element of a resource block.

A grouping unit 350 identifies one or more resource blocks adjacent a target resource block, the resource blocks included in the same group having related interference parameters as previously described herein. For example, the grouping unit 350 can predetermine which resource blocks have related interference parameters based on transmission bandwidth and/or interferer bandwidth, or by detecting edges in an image of the interference and identifying the second resource block based on the edges detected in the image of the interference as previously described herein.

An interference estimator 360 estimates interference based on pilot symbols transmitted via the target resource block and pilot symbols transmitted via one or more adjacent resource blocks included in the same group as previously described herein. The interference estimator 360 can calculate an impairment covariance estimate based on the pilot symbols transmitted via the target resource block and the pilot symbols transmitted via the one or more adjacent resource blocks e.g. in accordance with equation (2) but with some of the pilots being from adjacent resource block(s). The interference estimator 360 can limit pilot symbol contributions from adjacent resource blocks to those resource blocks that are within a predetermined frequency distance of the target resource block. In either case, the baseband processor 340 can perform interference rejection combining of the target data symbol based on a channel response estimate calculated for the resource element used to transmit the target data symbol, precoding information associated with the target data symbol and the impairment covariance estimate e.g. in accordance with equation (1) where the impairment covariance estimate is calculated based on the target resource block and one or more adjacent resource blocks.

The baseband processor 340 processes the pilot symbols and data symbols based on the interference estimates provided by the interference estimator 360. The symbols are decoded at decoder 370, and subjected to further processing by circuits 380. Only the elements of the receiver chain pertinent to this disclosure are depicted in FIG. 3, and other elements of the equipment containing the wireless receiver (e.g., transmitter, user interface, memory, camera, and the like) are omitted for clarity.

Parameter estimation can be performed for the interference parameters in a clustered region using either the original received data or the error measurements for the time-frequency positions in the corresponding clusters. As one example, interference rejection combining (IRC) may be performed within a clustered region using the interferer parameters determined within that region e.g. in accordance with equation (1) where the impairment covariance estimate is calculated based on a target resource block and one or more adjacent resource blocks as described previously herein. Other demodulation approaches include joint detection and subtractive interference cancellation.

In one embodiment, the error signals, from which the functions of impairment covariances are computed, may be constructed from the time-frequency positions in which reference (pilot) symbols for the desired signal were transmitted. In one embodiment, they may be constructed from data symbols at other time-frequency positions, after the data is decoded and subtracted out, leaving the error signal. Another alternative is to use as the error signal, the detected soft-value measurements from a receiver that does not perform interference cancellation (such as an MRC receiver).

Although the interference measure considered as a pixel value in a two-dimensional array for similar-interference region detection via image processing techniques can be the trace of the impairment covariance for each time-frequency position in the array, those of skill in the art will readily recognize, given the teachings of this disclosure, that the interference measure may comprise any of a variety of other quantities as well. For example, in one embodiment, the interference measure comprises the full covariance matrix at each relevant time-frequency position. In yet another example, the interference measure comprises some function of the covariance matrix, such as its determinant, maximum eigenvalue, or condition number. In another embodiment, the interference measure comprises the error signal itself. Note that the interference measure may be a simple scalar value, a complex value, a matrix value, a vector value, or, in general, any mathematical quantity that relates to or includes some information about interference in a received OFDM signal at a particular time-frequency position. Furthermore, regular patterns that might exist in the downlink signal may be incorporated into the similar-interference region identification, such as the identification or knowledge of reference OFDM pilot symbols.

Using adjacent resource blocks to provide additional pilots for impairment covariance estimation improves bit-error and block-error rate performance. Incorporating pilots from an adjacent resource block provides IRC gain whereas using only the pilots from the same resource block introduces a high error-floor that degrades IRC gain.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of estimating interference in an Orthogonal Frequency Division Multiplexing system, comprising:
   receiving at a wireless receiver pilot symbols and data symbols transmitted in time and frequency via resource blocks;
   predetermining a first resource block group by identifying two or more resource blocks having related interference parameters;
   detecting a first one of the data symbols transmitted to the wireless receiver via a time-frequency resource element of a first one of the resource blocks in said first resource block group;
   identifying a second one of the resource blocks in said first resource block group adjacent the first resource block; and
   estimating interference for the first resource block directly using the pilot symbols transmitted via the first resource block and the pilot symbols transmitted via the second resource block.

2. The method of claim 1, wherein predetermining a first resource block group comprises predetermining which resource blocks have related interference parameters based on transmission bandwidth.

3. The method of claim 1, wherein predetermining a first resource block group comprises predetermining which resource blocks have related interference parameters based on interferer bandwidth.

4. The method of claim 1, comprising:
   detecting edges in an image of the interference; and
   identifying the second resource block based on the edges detected in the image of the interference.

5. The method of claim 1, comprising calculating an impairment covariance estimate based on the pilot symbols transmitted via the first resource block and the pilot symbols transmitted via the second resource block.

6. The method of claim 5, further comprising performing interference rejection combining of the first data symbol based on a channel response estimate calculated for the resource element used to transmit the first data symbol, precoding information associated with the first data symbol and the impairment covariance estimate.

7. The method of claim 1, comprising estimating the interference based on the pilot symbols transmitted via the first resource block and the pilot symbols transmitted via the resource elements of the second resource block which are within a predetermined frequency distance of the first resource block.

8. The method of claim 1, comprising:
   identifying a plurality of the resource blocks adjacent the first resource block having related interference parameters; and
   estimating the interference based on the pilot symbols transmitted via the first resource block and the pilot symbols transmitted via the plurality of adjacent resource blocks.

9. A wireless mobile device operable to receive Orthogonal Frequency Division Multiplexing signals, comprising:
   a front end circuit operable to process pilot symbols and data symbols received in time and frequency via resource blocks;
   a symbol detector operable to detect a first one of the data symbols transmitted via a time-frequency resource element of a first one of the resource blocks in a first resource block group;
   a grouping unit operable to:
      predetermine the first resource block group by identifying two or more resource blocks having related interference parameters;
      identify a second one of the resource blocks in said first resource block group adjacent the first resource block; and
   an interference estimator operable to estimate interference for the first resource block directly using the pilot symbols transmitted via the first resource block and the pilot symbols transmitted via the second resource block.

10. The wireless mobile device of claim 9, wherein the grouping unit is operable to predetermine the first resource block group by predetermining which resource blocks have related interference parameters based on transmission bandwidth.

11. The wireless mobile device of claim 9, wherein the grouping unit is operable to predetermine the first resource block group by predetermining which resource blocks have related interference parameters based on interferer bandwidth.

12. The wireless mobile device of claim 9, wherein the grouping unit is operable to detect edges in an image of the interference and identify the second resource block based on the edges detected in the image of the interference.

13. The wireless mobile device of claim 9, wherein the interference estimator is operable to calculate an impairment covariance estimate based on the pilot symbols transmitted via the first resource block and the pilot symbols transmitted via the second resource block.

14. The wireless mobile device of claim 13, further comprising a baseband processor operable to perform interference rejection combining of the first data symbol based on a channel response estimate calculated for the resource element used to transmit the first data symbol, precoding information associated with the first data symbol and the impairment covariance estimate.

15. The wireless mobile device of claim 9, wherein the interference estimator is operable to estimate the interference based on the pilot symbols transmitted via the first resource block and the pilot symbols transmitted via the resource elements of the second resource block which are within a predetermined frequency distance of the first resource block.

16. The wireless mobile device of claim 9, wherein the grouping unit is operable to identify a plurality of the resource blocks adjacent the first resource block having related interference parameters, and wherein the interference estimator is operable to estimate the interference based on the pilot symbols transmitted via the first resource block and the pilot symbols transmitted via the plurality of adjacent resource blocks.

17. A base station operable to receive Orthogonal Frequency Division Multiplexing signals, comprising:
   a front end circuit operable to process pilot symbols and data symbols received in time and frequency via resource blocks;
   a symbol detector operable to detect a first one of the data symbols transmitted via a time-frequency resource element of a first one of the resource blocks in a first resource block group;
   a grouping unit operable to:

predetermine the first resource block group by identifying two or more resource blocks having related interference parameters;

identify a second one of the resource blocks adjacent the first resource block; and an interference estimator operable to estimate interference for the first resource block directly using the pilot symbols transmitted via the first resource block and the pilot symbols transmitted via the second resource block.

18. The base station of claim 17, wherein the grouping unit is operable to predetermine the first resource block group by predetermining which resource blocks have related interference parameters based on transmission bandwidth.

19. The base station of claim 17, wherein the grouping unit is operable to predetermine the first resource block group by predetermining which resource blocks have related interference parameters based on interferer bandwidth.

20. The base station of claim 17, wherein the grouping unit is operable to detect edges in an image of the interference and identify the second resource block based on the edges detected in the image of the interference.

21. The base station of claim 17, wherein the interference estimator is operable to calculate an impairment covariance estimate based on the pilot symbols transmitted via the first resource block and the pilot symbols transmitted via the second resource block.

22. The base station of claim 21, further comprising a baseband processor operable to perform interference rejection combining of the first data symbol based on a channel response estimate calculated for the resource element used to transmit the first data symbol, precoding information associated with the first data symbol and the impairment covariance estimate.

23. The base station of claim 17, wherein the interference estimator is operable to estimate the interference based on the pilot symbols transmitted via the first resource block and the pilot symbols transmitted via the resource elements of the second resource block which are within a predetermined frequency distance of the first resource block.

24. The base station of claim 17, wherein the grouping unit is operable to identify a plurality of the resource blocks adjacent the first resource block having related interference parameters, and wherein the interference estimator is operable to estimate the interference based on the pilot symbols transmitted via the first resource block and the pilot symbols transmitted via the plurality of adjacent resource blocks.

* * * * *

UNITED STATES PATENT AND TRADEMARK OFFICE
CERTIFICATE OF CORRECTION

PATENT NO. : 8,605,838 B2
APPLICATION NO. : 12/883698
DATED : December 10, 2013
INVENTOR(S) : Molnar et al.

Page 1 of 1

It is certified that error appears in the above-identified patent and that said Letters Patent is hereby corrected as shown below:

In the Specification

In Column 1, Line 67, in Equation (3), delete " $d_n W_{ML,n}{}^H Y_n$ " and insert -- $d_n = W_{ML,n}^H Y_n$ --, therefor.

Signed and Sealed this
Twelfth Day of August, 2014

Michelle K. Lee
*Deputy Director of the United States Patent and Trademark Office*